United States Patent [19]

Schwarze

[11] Patent Number: 4,779,436
[45] Date of Patent: Oct. 25, 1988

[54] PIPE BENDING MACHINE FOR PRODUCING A MARKING ON A PIPE

[76] Inventor: Rigobert Schwarze, Olpener Str. 460-474, 5000 Köln 91, Fed. Rep. of Germany

[21] Appl. No.: 877,431

[22] Filed: Jun. 23, 1986

[30] Foreign Application Priority Data

Jun. 22, 1985 [DE] Fed. Rep. of Germany ....... 3522379

[51] Int. Cl.[4] .......................... B21C 51/00; B21D 7/02
[52] U.S. Cl. .......................................... 72/34; 72/149; 72/307
[58] Field of Search ................. 72/152, 149, 156, 34, 72/33, 31, 307, 321, 369, 370

[56] References Cited

U.S. PATENT DOCUMENTS

| | | | |
|---|---|---|---|
| 360,288 | 3/1887 | Follett | 72/321 |
| 1,816,218 | 7/1931 | Henry et al. | 72/369 |
| 2,389,206 | 11/1945 | McKinney et al. | 72/34 |
| 3,042,099 | 7/1962 | Neely | 72/369 |
| 3,075,568 | 1/1963 | Bright | 72/34 |
| 3,287,952 | 11/1966 | Van Harten | 72/156 |
| 3,429,157 | 2/1969 | Huth | 72/32 |
| 3,821,887 | 7/1974 | Bennett | 72/34 |
| 4,574,553 | 3/1986 | Lisec | 72/369 |
| 4,654,912 | 4/1987 | Gray | 72/213 |

FOREIGN PATENT DOCUMENTS 48411 11/1984 Japan ..................... 72/152

*Primary Examiner*—Daniel C. Crane
*Attorney, Agent, or Firm*—Michael J. Striker

[57] ABSTRACT

A method of producing a marking on a pipe for identifying a location of an object to be mounted on the pipe includes forming the marking by a pipe bending machine in which the pipe is bent. For this purpose the pipe bending machine is provided with a marking device.

7 Claims, 1 Drawing Sheet

PIPE BENDING MACHINE FOR PRODUCING A MARKING ON A PIPE

BACKGROUND OF THE INVENTION

The present invention relates to a method for producing a marking on a pipe and also to a pipe bending machine for producing such a marking.

More particularly, it relates to a method and a pipe bending machine which has a feeding carriage unit reciprocable in longitudinal direction of a pipe and also movable in a transverse direction, and having a rotatable clamping device for clamping the pipe, a turnable bending table provided with a bending mold with clamping jaws, and a sliding rail associated with the bending mold. During bending of a pipe, the initial pipe is longer than the pipe which has been bent and is to be used, since a pipe to be bent must be clamped at its front end by clamping jaws on the bending mold and at its rear end by a clamping sleeve of the feeding carriage unit. Therefore, in many cases the bent pipe must be cut off at is front end and frequently at its rear end. Since the location of the clamping is not visible on the pipe in many cases, there is a difficulty in finding the points on the pipe in which the pipe must be cut off. For determining this, the pipe after bending is inserted into the form, in which the points of the cuts to be made can be identified. The operator draws at the respective locations of the pipe in correspondence with the form respective marks wherein the pipe is to be cut off.

A bent pipe is however not only to be cut at both ends or at one end. Mounting flanges for other holders must be mounted on the bent pipe as well. These objects are to be arranged not only on one end or both ends of the pipe, but in most cases they are distributed over the length of the pipe. For example, these objects are holders which must be attached to the pipe mainly by welding so as to connect the pipe by screwing to a support on the chassis in the event of an exhaust pipe of a power vehicle. The points at which the holders or similar mounting elements must be attached are determined conventionally by inserting the finished pipe into a form and providing markings manually in accordance with the form for attaching the holders or similar objects to the pipe. This operation is expensive and inaccurate. First of all, the manufacture of such a form is expensive. Since pipes are bent in a program on a pipe bending machine in many spatial shapes, therefore the forms must be provided with the respective plurality of shapes. This not only brings high cost for manufacturing of the forms but also the finished forms occupy a great space, and their storage and handling is complicated. Therefore, in many cases a sufficient accuracy for placing holders or other objects onto forms is compromised, and marking is produced on the pipe by a measuring device which in a simple case can be a foot rule. The use of a measuring device which must be adjusted for each spatial shape of the pipe, or the use of a foot rule is a source of errors in the manufacture, especially in mass production since it involves frequently a monotonous work which reduces concentration and thereby leads to faulty measurements and faulty judgments. Such a monotonous work requires a longer time for determination of the error and therefore the errors are connected with considerable losses in practice.

SUMMARY OF THE INVENTION

Accordingly, it is an object of the present invention to provide a method of producing marking for attaching mounting flanges and similar holders to a pipe which is simple and accurate.

In keeping with these objects and with others which will become apparent hereinafter, one feature of the present invention resides, briefly stated, in a method of producing a marking on a pipe for identifying a location of an object to be mounted on the pipe in accordance with which the marking is formed on a pipe bending machine.

When the method is performed in accordance with the present invention and the pipe bending machine has a form for forming the markings, the markings can be formed very accurately and at any points on the periphery of a pipe.

In accordance with other embodiments of the invention, the forming of the marking can be performed by an operator on a pipe which is clamped in the bending form at a location which is determined by the position of the feeding carriage unit and the clamping sleeve or it can be formed by a marking arrangement which is mounted in the pipe bending machine.

When the method is performed and the bending machine is designed in accordance with the applicant's invention it is possible to provide markings of different types. In accordance with a first proposal, the marking can be performed on a pipe inserted in the bending machine before bending of the pipe, by displacement and in some cases rotation of the pipe.

In accordance with a second proposal, the marking can be formed during the bending step. In accordance with a third proposal, the marking can be formed after the bending.

It is also possible to form a part of the marking before the bending, a part of further markings during the bending, and other markings after the bending, so that the above described three proposals can be used in combination. It is possible to combine the first proposal with the third proposal, the second proposal with the third proposal, or the first proposal with the second proposal. Thereby, the marking can be adjusted to the spatial conditions of the pipe bending machine and also to the spatial conditions, for example of the spatial form of the pipe to be bent or of the bent pipe.

The basic idea of the inventive method and machine makes possible to incorporate the process of producing the marking in the bending program. As a result of this, a very accurate formation of the marking is achieved, since the pipe bending machine has in this case a form of a certain type or a measuring device, and all elements of modern pipe bending machines which are available for determination of a location of predetermined bending in all elements for detecting and performing required corrections are used or can be used for forming the markings.

All measures which are used for production of pipes with high accuracy can also be used for producing the markings with high accuracy. The unit which in accordance with the present invention is proposed for producing a bent pipe and the marking on it has great advantages for the following reasons: with the insertion of the pipe into the pipe bending machine, thereby providing a single clamping for determination of an initial position "zero", the formation of markings and the bending can be performed starting from the above position "zero". Thereby an accurate formation of the marking, determined in correspondence with respective bending, is achieved.

The marking arrangement of several marking arrangements arranged in the pipe bending machine can be located at any point of the machine, closer to the inserted and not bent pipe or closer to the bent pipe. When several marking arrangements are provided in the pipe bending machine, a fast and simple adjustment to the type of the pipe bending machine and also adjustment to the spatial shape of the bent pipe can be provided.

It is especially advantageous when a marking arrangement is located in the region between the forward position of the feeding carriage unit and the bending form. And it is further advantageous when it is located in the region between the sliding rail and the bending form.

In accordance with a further embodiment of the present invention, the marking arrangement is reciprocable in a radial direction of the pipe. In this embodiment the marking arrangement is movable relative to the outer surface of the pipe and can be combined with the possibility available in the pipe bending machine to move the pipe for purpose of its marking relative to the marking arrangement. In pipe bending machines the feeding carriage unit is displaceable not only in the longitudinal direction of the pipe, but also in a direction which is transverse to the longitudinal direction.

In accordance with still a further proposal the marking arrangement is supported also displaceably in a longitudinal direction of the pipe. As a result of conventional movability of the pipe to be bent or of the bent pipe in the longitudinal direction in pipe bending machines, in combination with the above proposal, the marking arrangement can also move in the longitudinal direction of the pipe to be bent. Therefore, the formation of a marking can be adjusted to the spatial conditions in the pipe bending machine and to the spatial shape of the pipe in a simple manner.

The marking arrangement can be formed as a pin with a front end on which a marking paint is applied. However, it can be formed as a marking element which provides other marking types, for example by scratching or forming a depression in the outer surface of the pipe. This can be achieved by an edge of a drill at a predetermined point, as known in the art.

Also, in accordance with another embodiment of the invention, the marking arrangement can be formed as a device for generating a laser beam. With the use of a laser beam it is possible in an especially effective manner to provide a marking in form of a point, a line, or a surface, by displacing the pipe and additionally by displacing the marking device. The marking device formed as a generator of a laser beam has the advantage that it can be arranged at a distance from the outer surface of the pipe, for example at a distance of 20 cm. As a result of this, the marking arrangement does not interfere with bending of the pipe. The proposal to form markings by a laser beam is especially suitable when the marking or the markings are arranged at fixed locations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2, 3, 4:
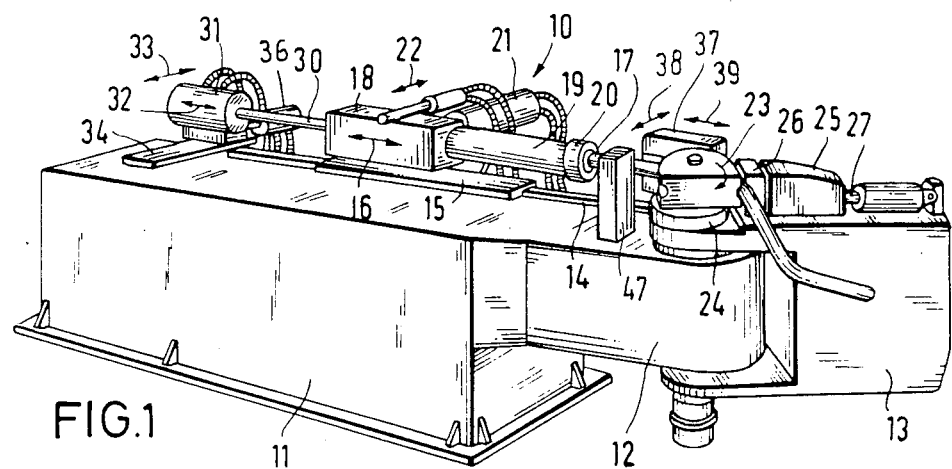
FIG. 1 is a pipe bending machine in accordance with the present invention, on a perspective view.
FIG. 2 is a view showing the pipe bending machine of the present invention in accordance with another embodiment.
FIG. 3 is a view showing a bent pipe provided with markings in accordance with the present invention.
FIG. 4 is a view showing the pipe of FIG. 3 with connecting elements which are attached to the pipe in correspondence with the markings.

FIG. 1 shows a pipe bending machine which is identified as a whole with reference numeral 10. The machine has a housing 11 which is composed of welded steel sheets and provided at its front end with a projecting front portion 12. A bending table 13 which is formed as a turnable arm is supported on the front portion 12. As can be seen from FIG. 1, a rail 14 is provided on the upper side of the housing. A carriage 15 is reciprocable on a rail 14 in the direction of arrow 16 which is a feeding direction of a pipe 17 to be bent.

The carriage 15 carries a carriage housing 18. A cylinder-piston unit 19 is mounted on the carriage housing 15 and has a clamping sleeve 20 in its interior. The elements 16, 18 and 19 together form a feeding carriage unit. The feeding carriage unit 15, 18, 19 is provided with a hydraulic cylinder-piston unit 21 which reciprocates the clamping sleeve 19 in the direction of arrow 22 for a purpose which will be explained in detail hereinbelow.

A pipe to be bent abuts against a bending form 23 which is mounted on a rotary plate 24. The latter is simultaneously turnable with the bending table 13. A clamping arrangement 25 with clamping jaws 26 is provided on the bending table 13. The clamping arrangement is actuated by a piston rod 27 of a hydraulic cylinder-piston unit 28 which is supported on an abutment 29 of the bending table 13. If during bending of a pipe 17 a mandrel is used, which is recommended for bending small radii of curvature, then a mandrel rod 30 is retained in a holder with a cylinder-piston arrangement. The latter displaces the mandrel rod 30 in the direction of arrow 33 on a carriage 34 transversely to the feeding direction of the pipe. This displacement is performed via a piston rod 35 of a cylinder-piston unit 36 shown in FIG. 2. Furthermore, a sliding rail 37 is provided, which is displaceable in the directions 38 and 39.

FIG. 2 shows a somewhat different embodiment of the pipe bending machine. Here the rail 14 is arranged not on the upper side of the housing or machine frame 11, 12 but instead is formed as a cylindrical rod 14a arranged laterally of the housing.

FIG. 3 shows the bent pipe 17 which is provided on its right end of the drawing with a marking 40 and at its opposite end with a marking 41. The markings are formed as two parallel lines. A marking 42 is further provided and formed as a surface which is rectangular on a plan view. Finally, a further marking 43 is provided on the pipe 17.

As can be seen from FIG. 4, the first marking 40 is arranged for cutting off the pipe in the region of this marking. The second marking 41 is provided for attaching the flange 44 in the region between two lines. The surface-shaped marking 42 is arranged for welding in its region a mounting element 45 which is formed as a rectangular plate. The marking 43 is arranged for welding in its region of an angular flange 46.

For forming the above described and other markings on a pipe, a marking arrangement 47 is installed on the upper side of the housing 11 in the region of the pipe 17. As shown in FIG. 2, the marking arrangement 47 has a pin 48 which forms a marking on the pipe 17. The arrangement can have only one pin which slightly dents the pipe on its upper side. It also can be formed as a paint applicator, in which case the paint is supplied through a hollow pin 48. It is especially advantageous to form the marking arrangement 47 as a laser beam generator. Such a marking arrangement can be located at a great distance from the pipe 17. Advantageously, the laser beam has a length of approximatey 20 cm to the upper surface of the pipe 17. This length can be smaller or greater. A laser beam is especially advantageous for marking of the pipe since the arrangement for producing the laser beam can be placed at a sufficient distance from the upper surface of the pipe 17.

The marking arrangement 47 is movable on a carrier plate 49 transversely to the pipe 17. The carrier plate 49 and thereby also the arrangement 47 is movable on a rail 50 in the direction of arrow 51. The rail 50 is simultaneously formed as a gear rack and a measuring rod, so that the position of the arrangement 47 in the program for pipe bending can be determined.

Several mounting arrangement 47 can be provided in the machine and movable on the rail 50. Also, another marking arrangement which is located at the opposite side of the pipe 17 relative to the arrangement 47 can be provided in the machine. Such another arrangement is identified with reference numeral 47a. Thereby two oppositely located marking arrangements can be supported so that they are simultaneously displaceable in the longitudinal direction of the pipe and can reach all points of the pipe with small own movement of the pipe via the feeding carriage unit with the clamping sleeve for the purpose of marking.

FIG. 3 shows that a line marking 52 extending in a longitudinal direction of the pipe can also be provided on the latter. This line marking 52 is provided for bringing the round flange 44 having mounting openings to such a position in which the openings on the periphery of the flange 44 are in alignment with the openings of another not shown flange.

Finally, as shown in FIG. 3, a marking 53 is provided for a branching pipe 54. The branching pipe 54 is mounted on the bent pipe 17 which is drawn from the bending machine, at the point determined by the marking 53. The mounting is performed by welding.

It will be understood that each of the elements described above, or two or more together, may also find a useful application in other types of constructions differing from the types described above.

While the invention has been illustrated and described as embodied in a pipe bending machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pipe bending machine, comprising
   means for bending a pipe in the pipe bending machine; and
   means for marking the pipe in the pipe bending machine so as to form a marking to identify a location of an additional subsequent step to be performed on the pipe,
   said pipe bending means including a feeding carriage unit movable in a longitudinal direction of the pipe and in a transverse direction and having a rotatable clamping device for clamping the pipe, a turnable bending table which carries a bending form, and a sliding guide associated with said bending form for supporting the pipe during bending,
   said feeding carriage unit being movable toward said bending form, said marking means being arranged in the region between said feeding carriage unit and said bending form and separate from said bending form, and said marking means being positioned so that said feeding carriage feeds said pipe successively past said marking means.

2. A pipe bending machine as defined in claim 1, wherein said marking means is arranged in the region between said sliding guide and said bending form.

3. A pipe bending machine as defined in claim 1, wherein said marking means is supported reciprocably in a radial direction of the pipe.

4. A pipe bending machine as defined in claim 3, wherein said marking means is supported displaceably in the longitudinal direction of the pipe.

5. A pipe bending machine as defined in claim 1, wherein said marking means includes a pin having a front end to be provided with a marking paint.

6. A pipe bending machine as defined in claim 1, wherein said marking means includes a device for generating a laser beam.

7. A pipe bending machine as defined in claim 6, wherein said device for generating a laser beam is arranged at a distance of approximately 20 cm from a surface of the pipe.

* * * * *